United States Patent [19]

Bahill et al.

[11] Patent Number: 5,118,102

[45] Date of Patent: Jun. 2, 1992

[54] BAT SELECTOR

[76] Inventors: Andrew T. Bahill, 1622 W. Montenegro, Tucson, Ariz. 85704; William J. Karnavas, 142 S. Tucson Blvd., #20, Tucson, Ariz. 85716

[21] Appl. No.: 340,486

[22] Filed: Apr. 19, 1989

[51] Int. Cl.$^5$ .............................................. A63B 71/00
[52] U.S. Cl. ................................. 273/25; 273/77 A; 273/32 H; 273/186 R; 73/13
[58] Field of Search ................. 273/26 B, 26 R, 29 A, 273/186 R, 194 R, 191 R, 191 A, 77 A, 181 H, 67 R, 72 R, 32 H; 73/13

[56] References Cited

U.S. PATENT DOCUMENTS

| | | | |
|---|---|---|---|
| 3,115,129 | 12/1963 | Merriman | 273/67 R |
| 3,116,926 | 1/1964 | Owen et al. | 273/26 B |
| 3,921,978 | 11/1975 | Warren | 273/67 R |
| 4,343,467 | 8/1982 | Newcomb et al. | 273/26 B |
| 4,399,996 | 8/1983 | Boyce | 273/26 B |
| 4,515,365 | 5/1985 | Horikoshi et al. | 273/25 |
| 4,577,863 | 3/1986 | Ito et al. | 273/26 R |
| 4,583,733 | 4/1986 | Ito et al. | 273/26 B |
| 4,652,121 | 3/1987 | Ito et al. | 273/26 R |
| 4,682,773 | 7/1987 | Pomilia | 273/26 B |
| 4,736,899 | 8/1988 | Hundley | 273/26 B |
| 4,836,541 | 6/1989 | Henley | 273/26 B |
| 4,871,168 | 10/1989 | Autorino | 273/26 B |

Primary Examiner—Theatrice Brown

[57] ABSTRACT

An instrument combining physical and physiological measurements of a person's swing of a bat determines the optimum bat weight to provide maximum efficient ball speed after contact. Also a process uses the instrument to obtain data on bat speed, plots a best fit curve to the bat speed data, determines and plots the ball speed after contact and selects the optimum bat weight.

5 Claims, 5 Drawing Sheets

BAT SELECTOR

BACKGROUND OF THE INVENTION

1. Field of the Invention

The invention relates to an instrument for measuring a player's bat speed. Over a number of swings, the bat speed data can be used to determine the maximum ball speed after contact and the optimum bat weight. Baseball and softball are examples of sports in which the use of the instrument would be appropriate. The invention also relates to a process of obtaining data on bat speed, plotting the bat speed data, fitting a best fit curve to the data, using the best fit curve of physiological data to obtain the ball speed after contact, plotting the ball speed, determining the maximum-ball-speed bat weight and the optimum bat weight.

2. Description of the Prior Art

Ball players have long been searching for a means and/or process of determining the best weight bat to take to the plate. That there has not been one to date highlights the need.

For the St. Louis Cardinals the weight of the bat is "the player's personal preference". On the New York Yankees, "each individual player determines the style of bat he prefers".

Fenn and Marsh, in 1935; Hill in 1938; and Wilke in 1950 discussed the decrease of muscle speed with increasing load.

In 1963 Kirkpatrick assumed an optimal bat weight to be one that "requires the least energy input to impart a given velocity to the ball".

In 1987 Brancazio, assumed the batter generates a fixed quantity of energy in a swing and determined that the ball's speed after collision depended on five factors. He concluded optimal bat weight to be 15 oz.

Gutman and Kaat, in 1988, discussed corking bats.

But the name of the game is not to have the least energy input for a given ball velocity nor to impart fixed kinetic energy to the bat.

It's a game of inches. And the key is ball speed. And distance. Through the infield. Into the gap. Just over the wall. Noone has determined before now the best bat weight in a given game situation for a player to impart maximum speed to the ball.

The present invention is directed toward a process for determining the maximum-ball-speed bat weight which combines determinations from the momentum equations and physiological determinations and an instrument which can be used to determine the maximum-ball-speed bat weight a player should use. The maximum-ball-speed bat weight is used to determine the optimum bat weight.

SUMMARY OF THE INVENTION

The invention relates to an instrument for measuring a player's bat speed. Over a number of swings, the bat speed data can be used to determine the maximum ball speed after contact. The optimum bat weight is determined. Baseball and softball are examples of sports in which the use of the instrument would be appropriate. The invention also relates to a process of using the instrument to obtain data on bat speed, plotting the bat speed data, fitting a best fit curve to the data, using the best fit curve of physiological data to obtain the ball speed after contact, plotting the ball speed, determining the maximum-ball-speed bat weight and the optimum bat weight. It is the coupling of the physiological equations to the conservation of momentum equations of Physics which is unique.

FIGS. 1, 2, and 3 show some of the results derived with this instrument respectively for a college baseball player, an 11 old boy, and a member of a major league professional baseball team.

DESCRIPTION OF THE PREFERRED EMBODIMENTS

Within this Description certain terms are defined as follows:

Ball: An object which is propelled to the near vicinity of a player and at which the player swings a bat.

Bat: The piece of material with which the player swings and, upon occassion, makes contact with the ball.

Contact: Contact or collision

Instrument: Instrument, equipment or device

Player: A player is a person who is using the bat, the swing of which is being measured by the instrument.

Optimum bat weight is the ideal bat weight of a given player which can be determined with the use of the instrument or process of the invention.

Optimal bat weight is a reference weight, in many cases 15 ounces.

Within this Description certain formulae are referenced. These are:

Physics
Conservation of Momentum $$m_1 v_{1b} + m_2 v_{2b} = m_1 v_{1a} + m_2 v_{2a} \quad (1)$$

Coefficient of Restitution $$e = -\frac{v_{1a} - v_{2a}}{v_{1b} - v_{2b}} \quad (2)$$

Combined Momentum and Restitution $$v_{1a} = \frac{(m_1 - em_2)v_{1b} + (m_2 + em_2)v_{2b}}{m_1 + m_2} \quad (3)$$

Referring now more particularly to the drawings, FIG. 1 represents Bat Speed and calculated Ball Speed after the collision both as functions of Bat Weight for an 80 mph pitch to a college baseball player. The dots represent the average of the five swings for each bat; the vertical bars on each dot represent the standard deviations.

FIG. 3 represents Bat Speed, Kinetic Energy given to the bat, and calculated Ball Speed after the collision, all as functions of Bat Weight for a 90 mph pitch for a member of the San Francisco Giants baseball team. Data for other professional baseball players were similar.

Using Kirkpatrick's 1963 definition in conjunction with the Combined (3):

$$\left(\frac{w2}{w1}\right)_{optimal} = \frac{v1a - v1b}{v1a - ev1b} \quad (4)$$

and assuming w1=5.125 oz., ball weight; e=0.55, coefficient of restitution; v1b=−80 mph, a typical pitch speed; v1a=110 mph, the ball speed needed for a home run; the optimal bat weight is 15 ounces.

Figure 3:
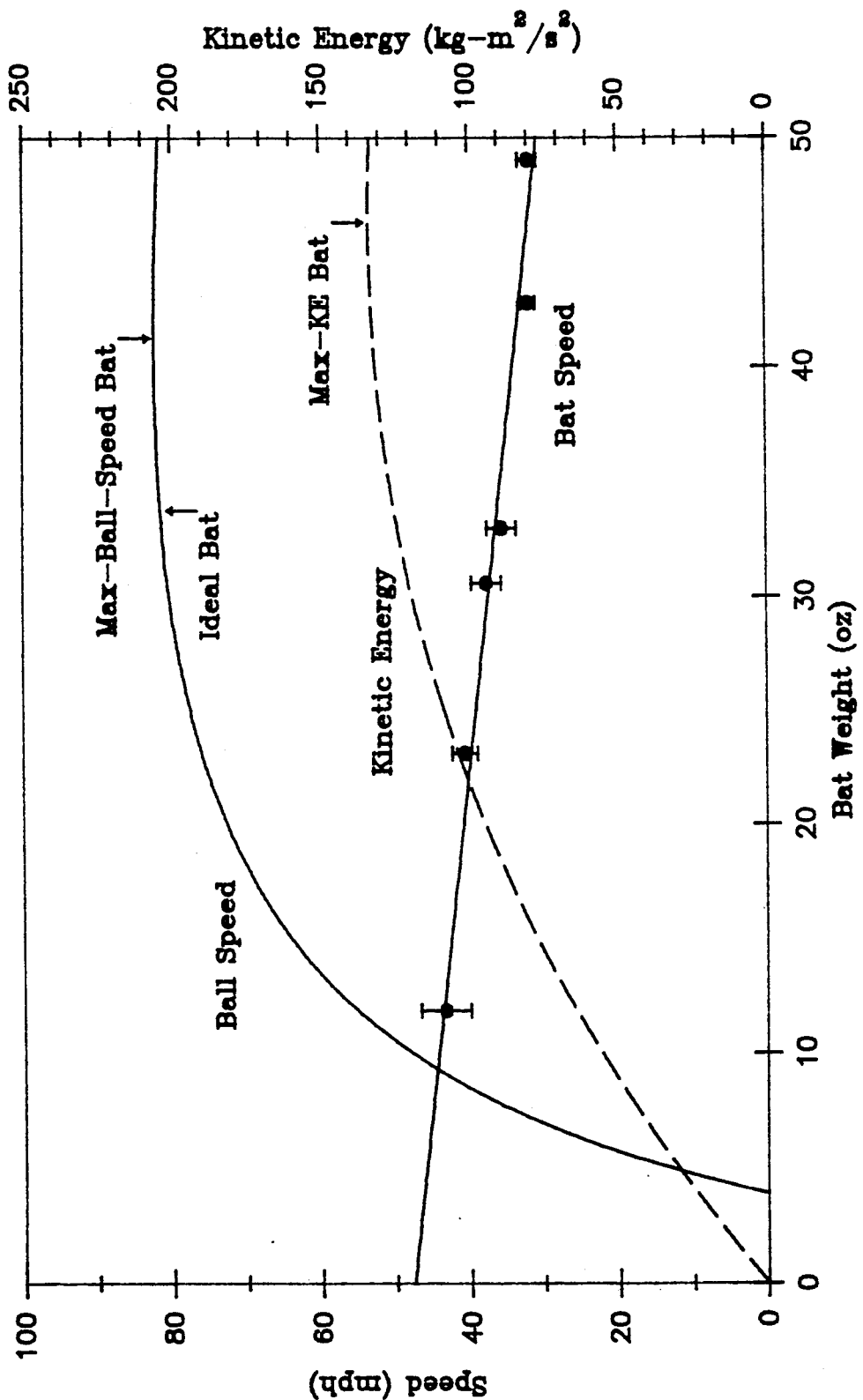

Conservation of momentum equations apply to ball bat collisions. The coefficient of restitution of the ball is important to the ball speed after collision. Physiologists know that muscle speed decreases with increasing load. Bicycles have gears for this reason. The force velocity relationship shows kinetic energy ($\frac{1}{2}$ mv squared) is zero when the bat weight is zero and when the bat weight is so heavy the velocity is zero. The maximum energy transfer bat weight is somewhere in between. The kinetic energy curve of FIG. 3 shows that a player swinging a 50 oz. bat imparts maximum energy to the ball.

The maximum energy transfer bat does not indicate the bat weight which will make the ball go farthest. The muscle force-velocity relationship must be coupled to the equations for conservation of momentum in order to obtain the maximum-ball-speed bat weight. Each player has a unique physiology which determines the optimum bat weight.

The Process

The player swings a bat once so that the center of gravity of the bat passes through the light beams. The player repeats the swing a number of times and uses a number of bats. In the Examples the number of bats is six for the adult players and four for the youngsters. In the Examples, the number of swings of each bat for each player is five. The bats vary in mass, volume and shape.

The bat speed data are plotted.

A number of physiologically realistic equations are fit to the data of the speed of the bat's center of gravity for the player. In the Examples three equations, a straight line, a hyperbola and an exponential curve were fit to the data of thirty swings for each of the adults and twenty swings for each of the youngsters.

Then the best fit equation is chosen for each player. The best fit will take into consideration the unique differences in each players physiology.

The resulting best fit equation is then combined with the coefficient of restitution and conservation of momentum equations, and manipulated and solved for the ball speed after collision and maximum-ball-speed bat weight.

The bat speed best fit, ball speed after collision and kinetic energy are plotted for the player.

Figure 1:
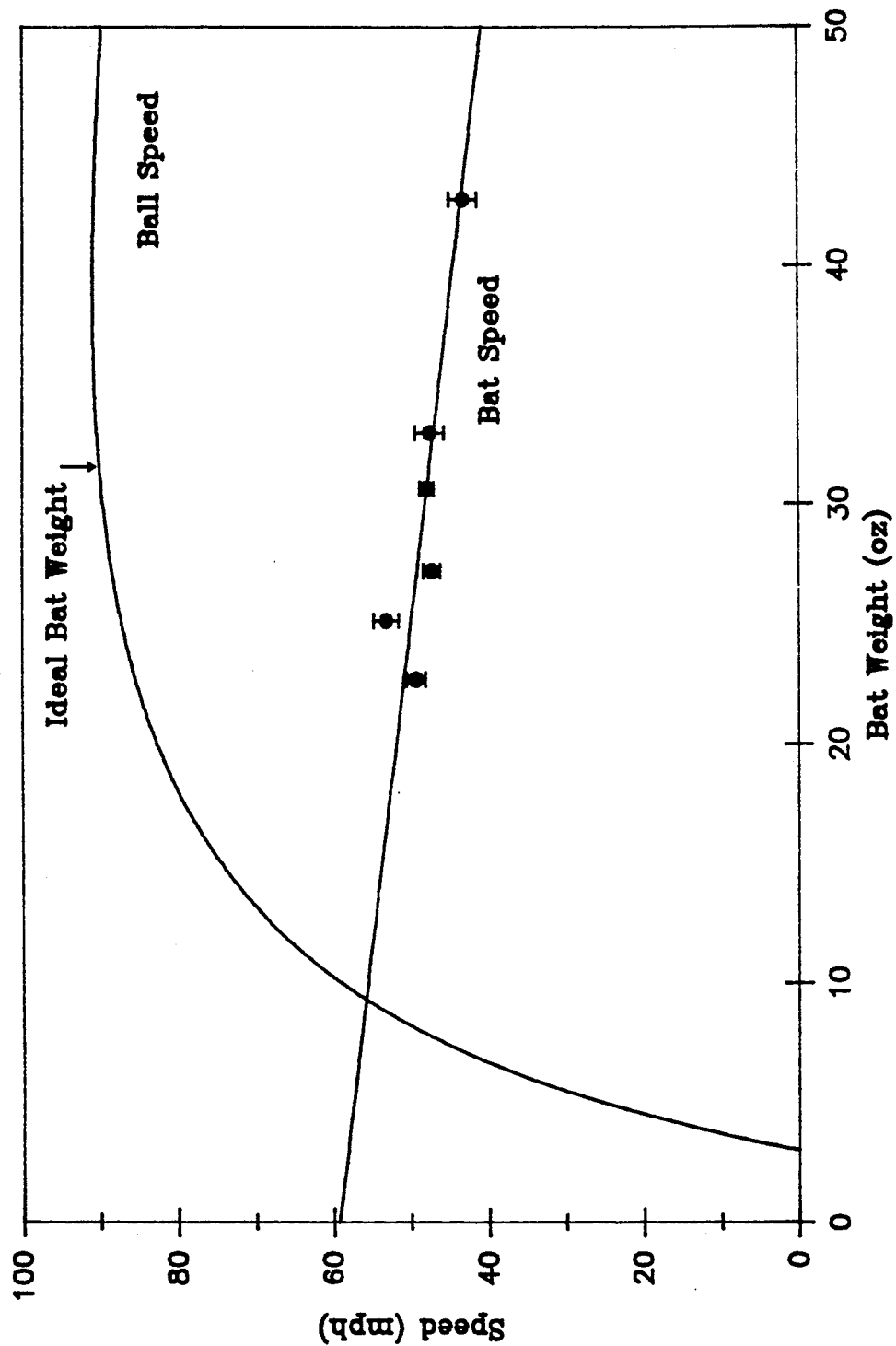

The maximum-ball-speed bat weight is not the best bat weight for any player. A lighter bat will give a player better control and more accuracy. A trade-off is made between maximum speed and controllability. Because the ball speed curve of FIG. 1 is so flat around the point of the maximum-ball-speed bat weight, it is believed there is little advantage to using a bat as heavy as the maximum-ball-speed bat weight.

Therefore, the optimum bat weight is arbitrarily defined to be the weight where the curve drops 1% below the speed of the maximum-ball-speed bat weight, in the direction of lower bat weight.

The optimum bat weight varies from person to person. Within any one league optimum bat weight is not correlated with height, weight or age.

Means

A means which determines the bat speed of a player's swing is used, e.g. the instrument of the invention.

The Instrument

The instrument may determine the bat speed of a player's swing, but in a preferred embodiment of the invention, the instrument is a hardware and software system that determines the optimum bat weight for each individual. When used on a major league baseball team, it found six were using bats that were too heavy for them, six were using bats that were too light for them and the other sixteen were using bats in their recommended range. When used on young ballplayers it predicted optimal bat weights in the range from 13 to 18 ounces, which is much lighter than any presently obtainable youth baseball bat.

The instrument has two vertical light beams, each with an associated light detector. Other suitable versions have up to about a dozen light beams. Light detectors suitable for use in the instrument of the invention are, e.g., an elevator door electric eye or a television camera. The player swings. A computer, part of the instrument, records the time between interruptions of the light beams by the swing of a player's bat. Suitable computers for use in this invention are, e.g., an Apple IIe. Having been programmed with the distance between the light beams and the time required for the bat to travel that distance, the computer calculates the speed of the bat's center of gravity for each swing. Next the instrument couples the force-velocity relationship of Physiology to the conservation of momentum equations of Physics to compute the optimum bat weight for that particular individual. The instrument then prints out the chart of batted ball speed and bat speed versus bat weight, indicating thereon the optimum bat weight.

The instrument and process of the invention are useful for determining optimum bat weight. Players who are using too heavy or too light a bat can be indicated. The instrument can tell a manager who has the fastest bat speed and whose batted ball speed has the potential to hit a home run. The instrument can also be used for training; it can be used to help judge the effectiveness of training programs on bat speed. The instrument can also help athletes train their swing so as to attain maximum speed at the instant of the bat-ball collision. And the instrument can also be used for advising a player how many warmup swings to take to avoid fatigue or speed up of swing during a time at bat or during a game.

The plotted bat speed curves indicate, by the size of the plotted points or bars on the chart for each bat weight the player has swung, the consistency of a player's swing. The consistency of a players swing can be improved. For example, a player's method of swinging can be selected which provides the most consistent swing. This can be done on a swing by swing basis. The player can choose a speed at which he wishes consistency. The player can swing once to see if can get the bat speed. He can then repeat, each time noting the deviation, until he has achieved the desired result.

EXAMPLES

Adult players

The bats used in the Examples varied from super light to super heavy. The bats did, however, have similar length and weight distribution. About three dozen bats were used in all. Used were aluminum bats, wood bats, plastic bats, infield fungo bats, outfield fungo bats, bats with holes in them, bats with lead in them, major league bats, college bats, softball bats, little league bats, brand new bats and bats over 40 years old. The adult players in the experiments described herein used the six bats of TABLE I, swinging each one five times. These bats are about 35 inches long, with the center of gravity about 23 inches from the end of the handle.

TABLE I

| name | mass oz | length inches | distance inches* | composition |
|---|---|---|---|---|
| D | 49.0 | 35.0 | 22.5 | aluminum bat filled with water |
| C | 42.8 | 34.5 | 24.7 | wood bat, drilled and filled with lead |
| A | 33.0 | 35.5 | 23.6 | regular wood bat |
| B | 30.6 | 34.5 | 23.3 | regular wood bat |
| E | 25.1 | 36.0 | 23.6 | wood fungo bat |
| F | 17.9 | 35.7 | 21.7 | wooden bat handle mounted on threaded steel lamp pipe with 6 oz mass attached to the end |

*from the end of the handle to the center of gravity.

EXAMPLE 1

A baseball player of the University of Arizona swung each of the six bats five times each so that the center of gravity on each swing passed through the light beams of the instrument.

After each swing, the speech synthesizer announced the choice of bat for the next swing. The choice was randomized by using any suitable random number system. The bat weight and linear velocity of the center of gravity, bat speed, for each swing were recorded by the computer.

The bat speed data were plotted.

Three equations, $y = Ax + B$, $(x+A)(y+B) = C$ and $y = Ae^{(-Bx)} + C$ were compared to the data for bat speed. The best fit for this player was:

$$\text{bat speed(in mph)} = -0.55 \text{ bat weight(oz)} + 89 \quad (5)$$

$$v2b = -0.55 m2 + 89$$

$$v2b = Am2 + B.$$

Taking the equation for conservation of momentus combined with that for the coefficient of restitution:

$$v1a = \frac{(m1 - em2)v1b + (m2 + em2)v2b}{m1 + m2} \quad (3)$$

wherein the subscript 1 is for the ball, 2 is for the bat, m is for mass, v is for velocity, e is for the coefficient of restitution, b is for before the bat-ball collision, and a is for after the collision and substituting therein the equation for ball speed yields:

$$v1a = \frac{(m1 - em2)v1b - (m2 - em2)(Am2 - B)}{m1 + m2} \quad (6)$$

The maximum-ball-speed bat weight becomes:

$$m2mbs = \frac{-m_1 A - \sqrt{m_1^2 A^2 - 4m_1(B - v_{1b})}}{A} \quad (7)$$

For the data of FIG. 1 this is 39 oz.

The points for ball speed were plotted on the graph of the data for bat speed. The kinetic energy data was also plotted. The x axis was the bat weight in oz. The result was FIG. 1.

Indicated on FIG. 3 for the sake of reference is the optimal bat weight of 15 oz. From a tangent to the kinetic energy curve parallel to the x axis, it can be seen that the maximum-energy-transfer bat weight occurs at 50 oz. It can be seen from FIG. 1 that the top of the ball speed curve is at a parallel to the x axis at a point representing a maximum-ball-speed bat weight of 39 oz.

The optimum bat weight can be seen at the point which the ball speed curve drops 1% below the speed of the maximum-ball-speed bat weight. Using this criterion, the optimum bat weight for this player was 32 oz.

YOUNGER PLAYERS

Younger players are in the age range 6 to 14. The physiology of youngsters differs from adult players. The younger players in the Examples used the four bats described in TABLE II. Despite the use of this lighter set of bats, fatigue was observed in five of the eleven youngsters.

TABLE II

| name | mass oz | length inches | distance inches* | composition |
|---|---|---|---|---|
| AA | 40.2 | 29.9 | 17.8 | wood bat with iron collar |
| CC | 25.1 | 28.0 | 17.3 | wood bat |
| DD | 21.1 | 28.8 | 17.0 | aluminum bat |
| BB | 5.2 | 31.3 | 17.6 | plastic bat |

*to the center of gravity

For all groups of swingers in the Experiments, the order of presentation was randomized. The selected bat was announced by a DECtalk@ speech synthesizer, e.g., as follows: "Please swing bat Hank Aaron, that is, bat A." The bat mass and the linear velocity of the center of gravity for each swing were measured.

EXAMPLE 2

Figure 2:
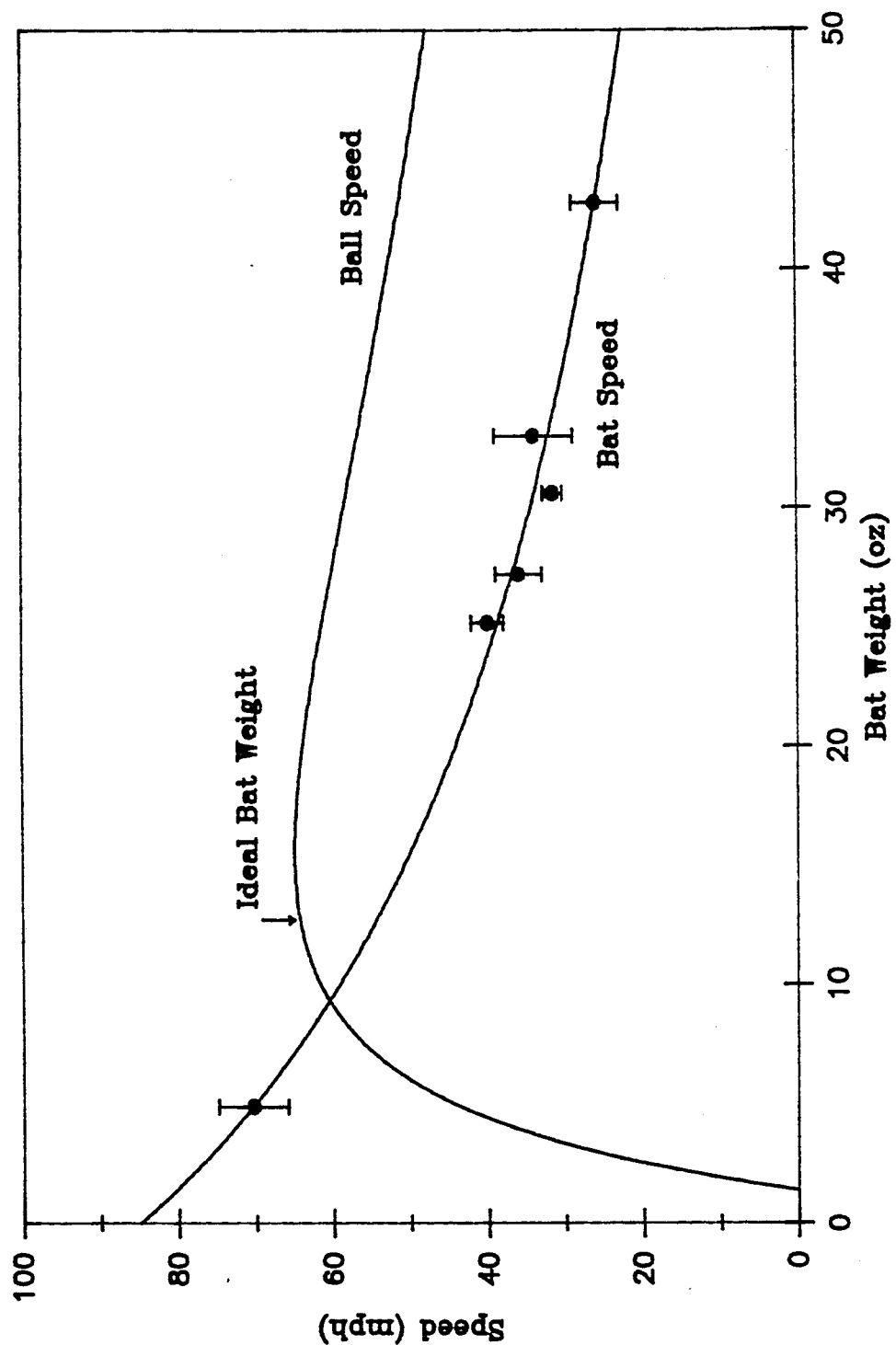
FIG. 2 represents Bat Speed and calculated ball speed after the collision both as functions of Bat Weight for a 40 mph pitch to Alex, a ten year old Little League player. The dots represent the average of the five swings of each bat; the vertical bars on each dot represent the standard deviations.

A little league youth swung 30 times at the instrument, each time placing his bat's center of gravity in proper juxtaposition. The bat speed data of FIG. 2 was produced. The equation of best fit for his swings was:

$$(w\text{ bat} + 28.0) \times (\text{bat speed} + 12.8) = 2734.$$

$$(m2 + 28.0) \times (v2b + 12.8) = 2734$$

indicating a hyperbolic fit. The calculated ball speed curve is shown in FIG. 2 as well as the kinetic energy curve. The maximum-ball-speed bat weight was determined to be about 15 oz. and the optimum bat weight about 12 oz.

A bat can be constructed of a foam filled or honeycomb layered material inside a light rigid, e.g. aluminum shell to provide a light weight bat, e.g. about 11 to about 18 ounces, for younger players. The length of these bats can be normal, e.g. in the range 20 to 40 inches. These light weight bats should allow better control for the younger players while still providing optimum bat weight.

MAJOR LEAGUE PLAYERS

In these experiments each player made 30 swings in 15 minutes. When graduate students do this the final swings are slower than the first, because of fatigue. Some of the major league players showed fatigue. Those who indicate fatigue could reduce batting practice or warmup swings. There were some players who swings increased in speed, indicated they were not warmed up enough. Those who indicate speed up could increase batting practice or warmup swings.

EXAMPLE 3

The player of FIG. 3 was typical of the major league ball players measured except that his swings were slower but more consistent than most. A summary of the 28 major league players showed maximum batted ball speed in miles per hour to be an average of 99 and in the range of 80 to 122. The optimum bat weight in ounces was an average of 31.7 in the range of 26.25 to 37.00. The actual bat weight that these players were using was an average of 32.3 ounces in the range of 31 to 34. The maximum kinetic energy, in kilograms meters squared per seconds squared, was an average of 270 in the range of 133 to 408.

Figure 4:
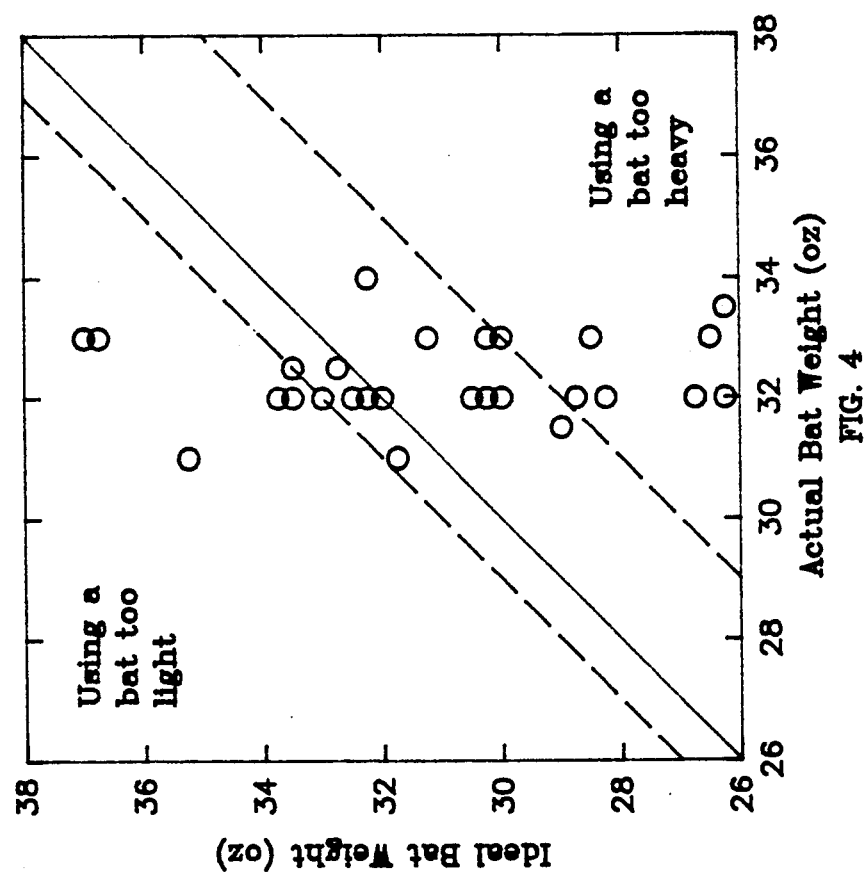
FIG. 4 represents Ideal Bat Weight versus Present (actual) Bat Weight for the San Francisco Giants. Most of them are presently using bats in their recommended range.

The specificity of optimum bat weight calculations is emphasized by FIG. 4 which shows the optimum bat weight as a function of the actual bat used by the players before the experiments.

Figure 5:
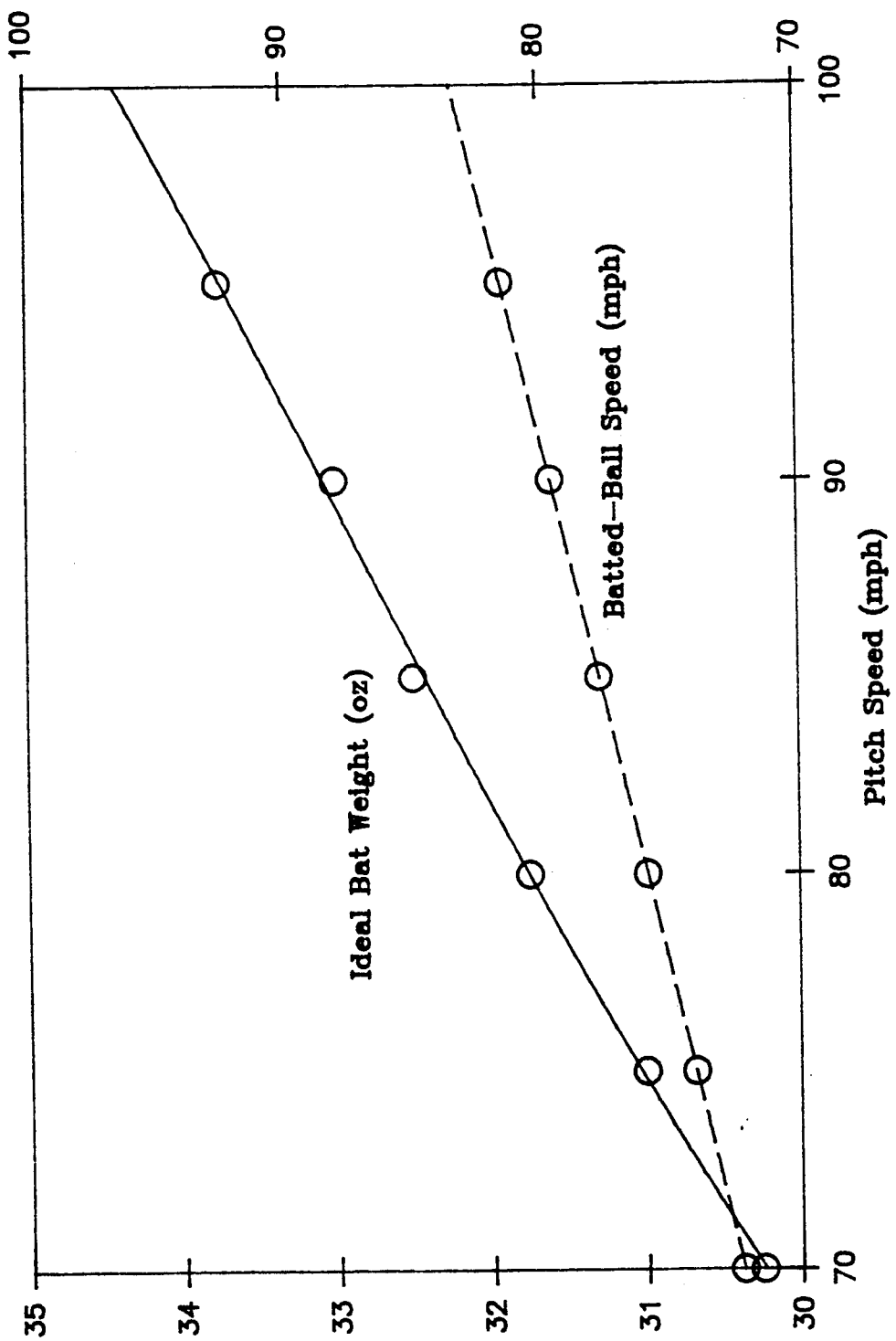
FIG. 5 represents Ideal Bat Weight and Batted-Ball Speed both as a function of Pitch Speed for the professional baseball player of FIG. 3.

The optimum bat weight also depends upon pitch speed. FIG. 5 shows this dependence of optimum bat weight on pitch speed for the ball player of FIG. 3 and Example 3. FIG. 5 also shows the resulting batted - ball speed after a collision with a bat of ideal weight. Such curves were typical of all the subjects. FIG. 5 shows that the ideal bat weight increases with increased pitch speed. The results may seem counter-intuitive. When an opposing pitcher has a good fast ball the suggestion to the batter often is to get a lighter bat. This is believed to be the coach's changing the subjective weighting of bat control versus distance. The batted ball speed depends on both pitch speed and bat weight.

Not only is the optimum bat weight specific for each player, it also depends upon whether the player is swinging right or left handed. Two switch hitters were measured: one's optimum bat weights were one ounce different and the other's were five ounces different. Switch hitters were so different right and left handed they were treated as separate ball players.

PLAYER SUMMARY

Table IV shows the mean and standard deviation of the ideal bat weight for batters in various organized leagues. These calculations were made with the pitch speed each player was most likely to encounter, i.e., 40 mph for youth and 20 mph for university professors playing slow pitch soft ball.

TABLE IV

| | Measured Optimum Bat Weight | | | |
|---|---|---|---|---|
| Team | *Mean OBW oz | Std Dev | Pitch Speed | Number subjects |
| Major League | 31.7 | 3.8 | 90 | 28 |
| University Baseball | 27.8 | 2.8 | 80 | 9 |
| University Softball | 27.8 | 3.7 | 60 | 12 |
| Youth League | 20.1 | 3.4 | 40 | 11 |
| Slow Pitch Softball | 19.4 | 1.0 | 20 | 4 |

*OBW is Optimum Bat Weight

The embodiments of the invention in which an exclusive property or privilege is claimed are defined as follows:

1. A bat selector comprising, means to obtain data for bat speed before bat collision with a ball for the swing of each bat of a set of diversely weighted bats; means to plot a point of each corresponding bat weight versus said bat speed data; means to fit a best fit curve to the plot of points of bat weight versus said bat speed data; means to use said best fit curve to obtain a mathematical equation for said speed before its collision with a ball; means to use said before its collision with a ball to obtain a mathematical equation for a batted ball speed after its collision with a bat; and means to plot a curve of said batted ball speed after collision versus bat weight.

2. The bat selector of claim 1 further comprising, means to select a range of bat weights at predetermined locations on a curve of bat weight versus said ball speed after collision.

3. The bat selector of claim 1 further comprising, means to select an optimum bat weight for maximum ball speed after said collision.

4. A bat selector process comprising, using an instrument having at least two vertical light beams, said beams being separated by a predetermined distance and each having a associated light detector and a computer; to record a time between interruption of said light beams by each of a plurality of bats swung by a batter, said bats having predetermined weight; to calculate the bat speed of the bat before collision with a ball, said bat speed being said predetermined distance divided by the time recorded between said interruptions of said light beams; to plot points of said bat speed versus bat weight data for a plurality of swings of each of a plurality of predetermined bat weights, said bat speed for each bat weight beige defined by V2b=Am+B, the bat speed before the collision of the bat with a ball equals A times the bat mass plus B, wherein A is a constant and B is a constant V2b is the bat speed; to apply a best fit curve to said bat speed before said collision versus bat weight data points; and to use said best fit curve in a combined Momentum and Restitution equation $$\frac{(V1a = emz)V1b + (m2 + em2)Vb)}{m1 + m2}$$

to an equation for ball speed after said collision.

5. The bat selection process of claim 1, in which an optimum bat weight is selected from said range of bat weights.

* * * * *